United States Patent [19]
Andrea

[11] 3,971,482
[45] July 27, 1976

[54] ANTI-LEAK CLOSURE VALVE

[75] Inventor: Christo Andrea, Windsor Locks, Conn.

[73] Assignee: Combustion Engineering, Inc., Windsor, Conn.

[22] Filed: Jan. 2, 1974

[21] Appl. No.: 429,605

[52] U.S. Cl. .............................. 214/27; 137/551; 176/31; 214/18 N; 251/215
[51] Int. Cl. ........................................... C21c 19/10
[58] Field of Search .......... 214/18 N, 27; 294/86 A; 176/31; 251/215; 137/551

[56] References Cited
UNITED STATES PATENTS

| | | | |
|---|---|---|---|
| 3,137,397 | 6/1964 | Nicoll et al. | 214/18 N |
| 3,629,062 | 12/1971 | Muenchow | 176/31 |

*Primary Examiner*—Robert G. Sheridan
*Attorney, Agent, or Firm*—Stephen L. Borst

[57] ABSTRACT

A spent fuel assembly handling tube closure valve is provided which assures minimal or zero leakage of trapped liquid metal coolant from the handling tube. One sealing surface of the closure valve is spherical while the other is conical. The spherical-conical combination enables an adequate seal even when the valve cap is misaligned. A further safeguard against leakage is made possible by a sacrificial inert gas system utilizing the diving bell principle. A metered gas supply system supplies additional sacrificial gas should a leak develop. A high-low level mutual inductance probe operates as a leak detector allowing the timely addition of greater quantities of sacrificial gas.

7 Claims, 4 Drawing Figures

ANTI-LEAK CLOSURE VALVE

BACKGROUND OF THE INVENTION

1. Field of the Invention

This invention relates to a closure valve for the end closure of a tube thereby enabling the leak-proof trapping of a liquid contained in the tube.

More specifically, the invention relates to the closure valve at the bottom of a spent fuel handling tube used for the refueling of a liquid metal fast breeder reactor.

2. Description of the Prior Art

Continuous operation of a nuclear power reactor results in the eventual depletion of the fuel elements. This necessitates periodic removal and replacement of the spent fuel assemblies. In removing and replacing the spent fuel assemblies, two major problems are encountered. The first is the high radioactivity of the elements. The second is the extreme temperatures generated by the continuing decay of the fuel element fission by-products.

The danger of radioactive exposure or accident is overcome by refueling safeguards which include extensive shielding and precautionary measures such as hermetic seals, remote handling and evacuation and flushing techniques. On the other hand, the excessive heat generated by a spent fuel element requires the removal of spent fuel assemblies to be accomplished with continuous cooling provisions. Two alternatives for handling excessive heat during refueling have been developed in the prior art. When the temperatures involved are low enough, the fuel assemblies are removed directly from the reactor with constant cooling by an air or gas coolant. This method is not acceptable for the fast breeder reactor since the temperatures generated are so high that the rather inefficient gas cooling method would not prevent the fuel element cladding from melting. Accordingly, the high temperatures generated by the continuing decay of a spent fuel assembly of a fast breeder reactor require the second, more efficient, "wet" or liquid cooling method where the spent fuel is continuously immersed and cooled by a liquid coolant.

Methods have been developed in the prior art (for example, see U.S. Pat. No. 3,629,062 issued to Herbert O. Muenchow) which involve the transfer of the spent fuel assemblies from their positions in the reactor core to closed bottom decay pots positioned adjacent to the reactor core within the reactor vessel. Prior art methods of this type require expensive and complicated handling equipment to be located within the reactor vessel. Another prior art method which also requires interior handling equipment provides spent fuel storage space within the reactor vessel. As a result, a larger reactor vessel is needed to accommodate the decaying fuel elements. Any failures that are incurred in the handling equipment on the interior of the reactor are difficult and costly to repair. This results not only from the fact that the interior of the reactor vessel is highly radioactive and is generally inaccessible but also from the fact that the liquid metal of a liquid metal cooled reactor is opaque and in-vessel inspection cannot be easily made. An additional cost is incurred for in-vessel storage by the requirement that a large inventory of fuel assemblies be maintained since the decaying spent fuel assemblies in their decay positions in the interior of the reactor pressure vessel are sealed into the reactor pressure vessel until the next refueling. Periodic refueling is required on the average of once a year while the decay time required to bring the fuel assembly to cooler temperatures is only 120 days.

An alternate solution is possible and involves the direct removal of the spent fuel assembly from the reactor and immediate transportation of this spent fuel assembly to an external decay tank. Such a solution requires the spent fuel handling machine to have provision for continuous wet cooling. The handling machine must also be open at one end for the direct insertion and removal of the spent fuel assembly. The liquid metal coolant of the reactor is used as the coolant of the handling machine and is trapped in the handling machine when the spent fuel assembly is inserted into the machine. Since the liquid sodium of a liquid sodium cooled fast breeder reactor is radioactive and has extreme pyrophoric properties, provisions must be made for a leak-proof handling tube end closure valve.

SUMMARY OF THE INVENTION

In a liquid sodium cooled fast breeder reactor, it is necessary to remove spent fuel assemblies under conditions which allow the rapid dissipation of large amounts of heat from the spent fuel. One method is to deposit, in one step, the spent fuel directly into a handling tube which is filled with liquid sodium and which is immediately removed from the reactor to an external decay tank by a spent fuel handling machine. This invention provides a handling tube closure valve designed to prevent the leakage of liquid sodium from the handling tube. The exit-entrance opening in the handling tube is sealed off by a cap plate with conical sealing surfaces which seal with spherical sealing surfaces on the handling tube exit opening. The spherical and conical sealing surfaces assure a good seal even if the closure valve cap is slightly askew. In addition, a sacrificial gas system is provided so that if a leak does in fact occur, only inert sacrificial gas is leaked and not the liquid sodium. The closure valve cap has a skirt that forms a diving bell and an annulus with a raised collar into which the inert gas is pumped. The inert gas is metered so that if a leak of the gas develops, additional quantities of gas can be pumped into the annulus assuring that only gas and not liquid sodium is leaked to the exterior of the handling tube. A monitoring system, a mutual inductance probe, is provided to determine the level of the gas-liquid interface and to determine how much additional gas need be supplied to the annulus in order to prevent liquid sodium leakage. Liquid sodium leakage will only occur if the total leakage past the closure valve is greater than the gas delivery system's capacity to deliver gas to the annulus.

DESCRIPTION OF THE PREFERRED EMBODIMENT

Figures 1, 2:
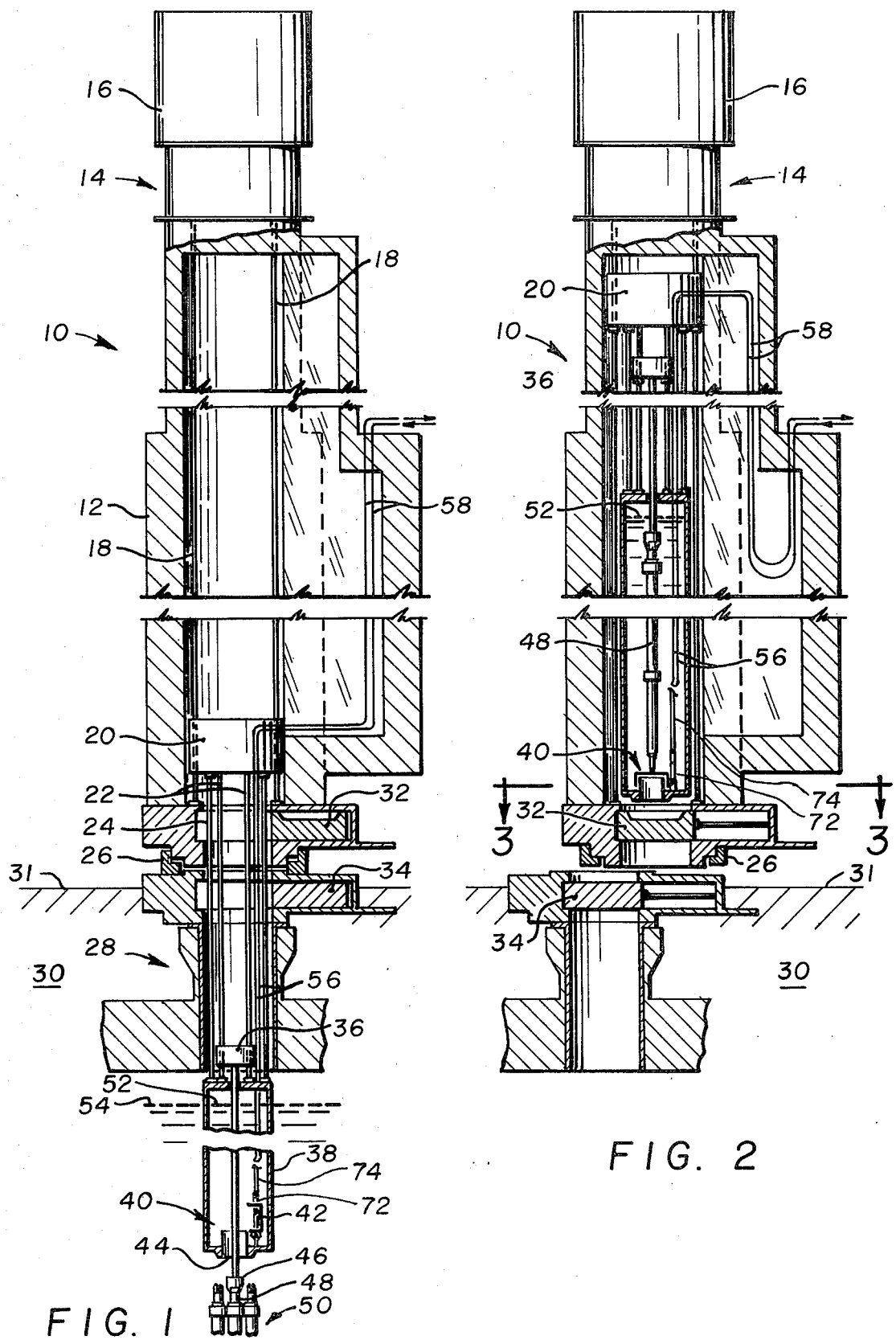
FIG. 1 is a drawing of a spent fuel handling machine for a sodium cooled fast breeder reactor with its handling tube and fuel element gripper fully extended.
FIG. 2 is a drawing of a spent fuel handling machine as in FIG. 1 but with its handling tube and gripper fully withdrawn.

FIG. 1 represents a spent fuel handling machine generally indicated by 10. The handling machine's purpose is to reach into a liquid metal fast breeder reactor generally indicated by 30 and to retrieve a spent fuel element or sub-assembly 48 from the reactor core 50. The machine 10 is provided with biological shielding 12 which is designed to shield the nuclear radiations emanating from the continuously decaying fuel sub-assembly 48 when it is withdrawn from the reactor 30 and positioned within the handling machine 10. Driving motors and mechanisms for the handling of the fuel sub-assembly are located at the top of the machine 10 in region 14. The driving forces are transmitted to the various moving parts (whose description follows) of the machine 10 by telescoping connections which allow for the up and down translation of the machine parts. These telescoping connection means are not shown for they do not constitute part of the invention and would needlessly complicate the drawing and description. (See U.S. Pat. No. 3,629,062 which describes similar telescoping means). Above the drive motor area 14 is located a tank 16 which contains an emergency coolant. This discussion shall be directed to a sodium cooled fast breeder reactor but it is not intended that the scope of the invention be so limited. Thus, tank 16, for present purposes, would contain liquid sodium. The entire machine 10 is slung from a gantry and crane (not shown) by appropriate hanging means on the handling machine (also not shown). Before the transfer process is initiated, the handling machine 10 is maneuvered over a removable floor plug 28 in the reactor head 31 and a shield skirt 26 is lowered to make a shielded hermetic seal with the floor plug 28. Once a hermetic seal is achieved, isolation valve 32 in the bottom of the handling machine 10 and floor valve 34 in the floor plug are opened to allow communication with the interior of the reactor.

A spent fuel sub-assembly handling tube 38 (shown in FIG. 1 fully extended into the reactor) is suspended from the interior of the handling machine 10. A handling tube carriage assembly 20 is movably mounted on tracks 18 which extend the full length of the interior of the handling machine 10. These tracks 18 allow the handling tube carriage assembly 20 to be moved from a full up position to a full down position. The handling tube 38 is suspended from the handling tube carriage assembly 20 by handling tube support columns 24. When the handling tube carriage assembly 20 is in its full up position, the handling tube 38 is withdrawn completely into the handling machine 10. Conversely, when the handling tube carriage assembly 20 is in its full down position, the handling tube 38 is inserted into the reactor 30 and is in position for receipt of a spent fuel sub-assembly 48, a position which puts the handling tube 38 predominately below the surface 54 of the liquid sodium in the reactor 30. The spent fuel sub-assembly 48 is gripped by a gripper 46 and lifted from the core 50 into the handling tube 38 by gripper carriage 36. The gripper carriage 36 is movably suspended from the handling tube carriage assembly 20 by gripper assembly carriage rails 22. Passage of the gripper 46 and spent fuel sub-assembly 48 into and out of the handling tube 38 is made possible by handling tube opening 44. This opening 44 may be sealed by a handling tube closure valve generally indicated by 40 with valve cap 42. When the closure valve 40 is closed, liquid sodium with level 52 is trapped within the handling tube 38. The closure valve 40 (the description of which follows) is designed to assure that the trapped liquid soidum does not leak from the handling tube 38 when it is raised from the reactor 30. The design of the closure valve 40 allows a gravity assisted seal by the trapped liquid sodium pressing down on the closure valve cap 42. In fact, the sub-assembly 48 may also be used to assist the closure valve seal by either resting the sub-assembly 48 on the closure valve cap 42 when the cap is in its closed position or by providing a positive downward thrust on the closure valve cap 42 through the sub-assembly 48 by the gripper 46 and the gripper carriage 36.

In order to provide continuous cooling of the spent fuel sub-assembly 48, the handling machine is equipped with heat transfer means located within the handling tube 38. This heat transfer or cooling means consists of rigid cooling tubes 56 extending from the handling tube carriage assembly 20 into the handling tube 38 to a position well below the liquid sodium level 52 maintained in the interior of the handling tube 38. The rigid cooling tubes 56 are connected to flexible tubes 58 which allow the movement of the handling tube 38 up and down in the handling machine 10 while continuously providing cooling heat transfer within the handling tube 38. The flexible tubes 58 connect to an exterior heat exchanger (not shown) and contain an appropriate heat exchange medium or coolant such as NaK.

Figure 3:
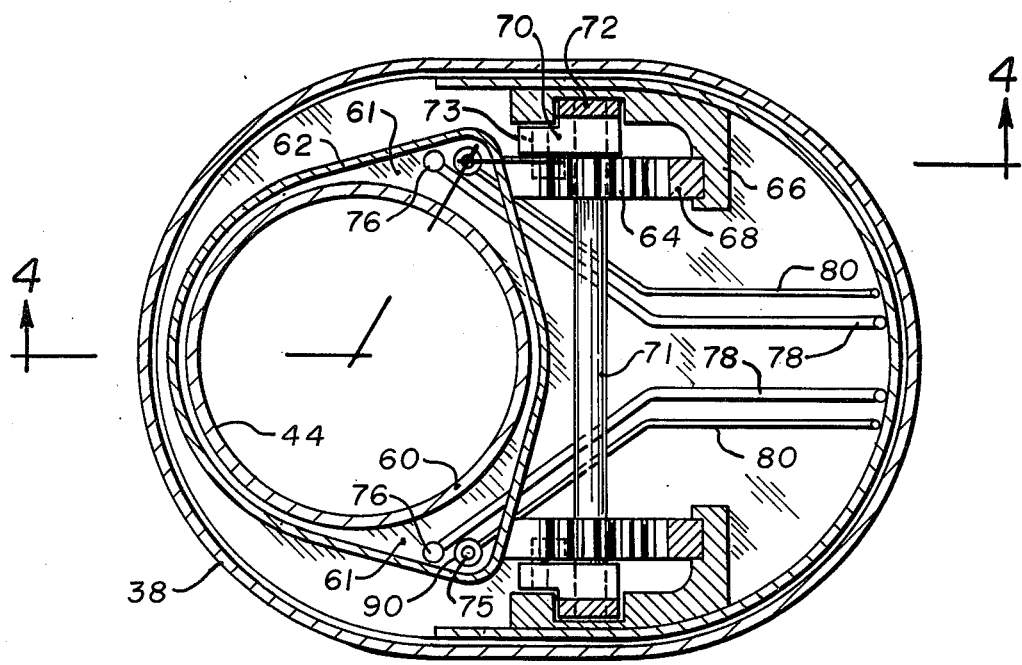
FIG. 3 is a plan view of the handling machine of FIG. 1 taken along lines 3—3 in FIG. 2 showing the handling tube end closure valve.
Figure 4:
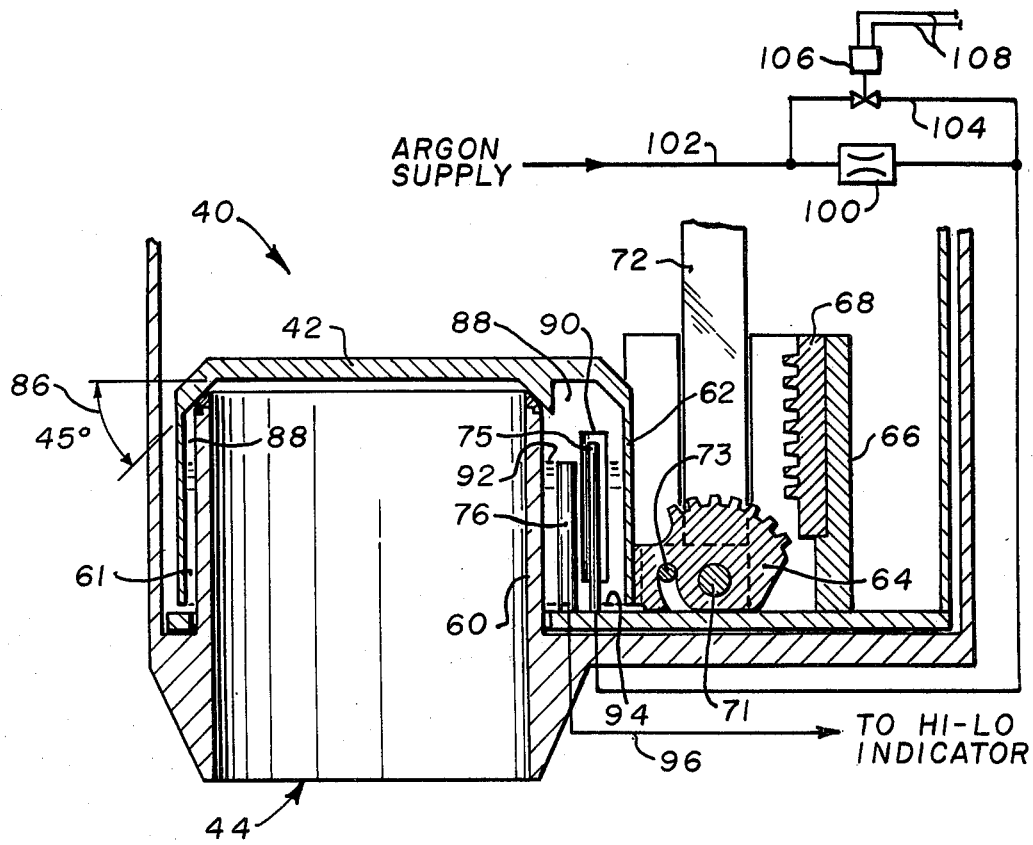
FIG. 4 is a cross-sectional drawing of the end closure valve taken along line 4—4 of FIG. 3.

FIGS. 3 and 4 show the appropriate detail of the handling tube closure valve 40. The closure valve 40 consists of a valve cap 42 and a handling tube opening collar 60 which projects into the interior of the handling tube 38. The valve cap 42 is equipped with a conical sealing surface 82 and the collar 60 is provided with a corresponding spherical sealing surface 84. Conical sealing surface 82 and spherical sealing surface 84 are fashioned to have an optimum angle of 45° as represented by sealing angle 86. The preferred combination of a conical surface 82 at an angle 86 of 45° and a spherical sealing surface 84 at a sealing angle 86 of 45° allows for adequate sealing even if the closure valve cap 42 is slightly misaligned when sealing contact is made. The sealing surfaces 82 and 84 may be constructed of an appropriate material which best accomplishes the task of providing an acceptable seal and best withstands the rigorous conditions of a liquid sodium environment including high temperatures and intense radioactivity. Proposed materials might consist of cermet (Aluminum Oxide High Temperature Metals) or a resistant material sold under the trademark "718 Inconel." The closure valve cap 42 is also provided with a skirt 62 which fits over and projects down around the raised collar 60 when the closure valve 40 is in a closed position, thereby forming an annular space 61 between the valve skirt 62 and the collar 60.

As can best be seen in FIGS. 3 and 4, the handling tube 38 has an obround shape and the exit opening 44 is positioned off to one side. By so positioning the exit opening 44, the closure valve cap 42 is provided clearance for tilting up and storage to the side of opening 44 so that unimpeded passage of the gripper 46 and the spent fuel sub-assembly 48 may be made through opening 44. The actuating mechanism for the lifting and tilting of valve cap 42 is provided by a rack and pinion arrangement. Two gears 64 are fastened to the valve cap 42 and are connected by a central shaft 71. The shaft 71 is allowed to extend beyond the exterior surfaces of gears 64 and these projecting portions pass first through a supporting yoke 72 and then into a guide 70 attached to the handling tube 38. The guides 70 allow the supporting yoke 72 to lift the shaft 71, gears 64 and valve cap 42 in an upward direction parallel to the axis of the handling tube 38. After the valve cap 42 and the attached gears 64 undergo a short upward displacement, the gears 64 engage stationary gear racks 68 which are held in place by a support piece 66. During the above-described lifting process, the closure valve cap 42 is temporarily held in a horizontal position by restraint pin 73 which slidably fits into a grooved portion of the gear piece 64 and which is fixed to the yoke 72. When the gears 64 engage the gear rack 68, the gears 64 and thus the closure valve cap 42 are caused to rotate up and to one side about the shaft 71.

The handling tube closure valve 40 also includes a secondary or backup system for the prevention of leakage of liquid sodium from the handling tube 38. This system consists of a means for providing a sacrificial gas which is allowed to leak if a leak develops rather than the liquid sodium trapped in the handling tube 38. The operating principle is that of the diving bell. As previously described, the closure valve cap 42 is outfitted with a skirt 62. The cap 42 and the skirt 62 constitute the inverted cup or the diving bell into which an inert gas, argon, is introduced by a gas pipe 75 which has its own diving bell 90 in order to prevent liquid sodium from entering the gas pipe 75 and solidifying therein. By introducing gaseous argon into the underside of the closure valve cap 42, liquid sodium is displaced downward and a sacrificial argon gas pocket 88 is formed. Any leak that develops in the closure valve 40 between sealing surfaces 82 and 84 will first leak the sacrificial argon rather than liquid sodium. In order to detect the leakage of argon from the gas pocket, a liquid sodium level detector 76 is provided to monitor the level of the liquid sodium. First, argon is pumped into the annular space 61 until the liquid sodium has reached a low level indicated by 94. The level of liquid is monitored by the level detector 76, which could be a mutual inductance probe, whose signal is carried to an indicator mounted on the operator's control board by leads 96. The monitor 76 is sensitive to at least one other liquid level, the high level indicated by 92. If the liquid sodium level is seen to go from the low 94 to the high 92 levels, then a leak of the argon is evident and appropriate compensatory measures are required. One possible measure which could be taken is to introduce additional argon into the annular space 61 to compensate for the rate of leakage. The argon gas supply system is designed to allow such a compensatory measure. Argon supply line 102 supplies a continuous supply of argon to the delivery system. In its standby mode, the argon supply system provides a continuous flow of small amounts of argon, by means of a fixed orifice constant flow control valve 100 (approximately 1 cubic foot per hour) to the outlet gas pipe 75 to assure that the gas line 75 and the outlet are always free of liquid sodium. When a significant leak does develop, an alternate operational mode is available to supply a high volume flow to the annular space 61. The operational mode consists of a high volume by-pass line 104 and a solenoid valve 106 which by-pass the fixed orifice constant flow control valve 100. The solenoid valve 106 can be operated either manually or automatically by electrical control leads 108 when the sodium level reaches the high level 92.

The operation of the spent fuel handling machine 10 is as follows. The machine 10 is maneuvered into position above the floor plug 28. When appropriately positioned, the shield skirt 26 is lowered into a hermetically sealing position. Once this seal is accomplished, a gas space (not shown in either FIGS. 1 or 2) between isolation valve 32 and floor valve 34 is purged of air and filled with inert gas (argon). Then isolation valve 32 and floor valve 34 are opened and the handling tube carriage assembly 20 is moved down to its lower position which inserts the handling tube 38 into the reactor 30 just above the core 50 and the spent fuel sub-assembly 48 to be removed. The handling tube closure valve 40 is then opened by tilting it up and to one side. The gripper carriage 36 is next lowered until the gripper 46 comes into contact and grips the spent fuel sub-assembly 48. Raising the gripper carriage 36 and the gripper 46 then lifts the spent fuel sub-assembly 48 out of the reactor core 50 and into the handling tube 38. The sub-assembly 48 must be raised approximately twelve inches beyond the closure valve 40 to allow the closure valve cap 42 to be swung back to its sealing position. After this has been accomplished, thereby trapping liquid sodium in the handling tube 38, the spent fuel sub-assembly 48 is lowered onto the top of the closure valve cap 42 to assist in making a leak-proof seal. Inert gas is next introduced into the annular space 61 until the now trapped liquid is forced to its low level 94 in the annular space 61. The handling tube is then raised to a position above the liquid sodium level 54 in the reactor 30. The handling tube 38 is maintained in this intermediate position while the leakage rate is monitored by the liquid level mutual inductance probe 76. If no leakage is apparent, the handling tube 38 may be moved to its full up position in the refueling machine 10. If a leak is apparent, either the leakage rate may be offset by adjusting the supply of sacrificial gas to the annular space 61 or if the leak is serious, the spent fuel sub-assembly 48 may be placed back into its position in the reactor core 50 and the handling tube 38 removed from the handling machine 10 for repairs. Assuming that a serious leak does not develop, the handling tube 38 is drawn up into the handling machine 10; isolation valve 32 and floor valve 34 are closed; shield skirt 26 is lifted; and the handling machine 10 is conveyed to a decay tank where the entire process may be reversed for deposit of the spent fuel sub-assembly in the decay tank.

What is claimed is:

1. In combination with a liquid metal cooled reactor fuel assembly handling machine of the type wherein a handling tube is provided for handling said reactor fuel assemblies, the improvement which comprises:
    a. an open ended handling tube;
    b. an inwardly facing raised collar at the open end of said handling tube;
    c. a valve cap adapted to seal with said collar; and
    d. means within said handling tube and connected to said valve cap for closing said valve cap and for raising and swinging said valve cap away from said opening thereby allowing said fuel assembly to be inserted into and removed from said handling tube.

2. The combination and improvement as recited in claim 1 wherein the edge of the inwardly facing lip of said raised collar has a spherical shape and said valve cap has a conical sealing surface adapted to seal with said edge of said lip.

3. In combination with a liquid metal cooled reactor fuel assembly handling machine of the type wherein a handling tube is provided for handling said fuel assemblies, the improvement which comprises:
 a. an open ended handling tube;
 b. an inwardly facing raised collar at the open end of said handling tube, said collar having a spherical valve seat;
 c. a valve cap with conical sealing surface adapted to seal with said collar's spherical valve seat;
 d. a valve cap skirt adapted to fit over said raised collar forming an annular space between said raised collar and said skirt;
 e. means within said handling tube and connected to said valve cap for closing said valve cap and for raising and swinging said valve cap away from said opening thereby allowing said fuel assembly to be inserted into and removed from said handling tube;
 f. means within said annular space for introduing a sacrificial fluid into said annular space thereby forming a sacrificial fluid pocket within said annular space; and
 g. means within said annular space for monitoring the leakage of sacrificial fluid out of said annular space.

4. The improvement recited in claim 3 wherein said valve cap conical sealing surface and said spherical collar valve seat are adapted to contact one another at an angle of 45°.

5. The improvement recited in claim 3 wherein said sacrificial fluid leakage monitoring means consists of a liquid metal level indicator.

6. The improvement recited in claim 5 wherein said liquid metal level indicator consists of a mutual inductance probe with at least a low and a high level sensitivity.

7. The improvement recited in claim 3 wherein said sacrificial fluid introduction means includes a diving bell gas orifice.

* * * * *